(12) United States Patent
Sillasto et al.

(10) Patent No.: US 7,680,501 B2
(45) Date of Patent: Mar. 16, 2010

(54) LOCATING MOBILE TERMINALS

(75) Inventors: Eero Sillasto, Helsinki (FI); Maurizio Spirito, Turin (IT)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/000,389

(22) Filed: Dec. 1, 2004

(65) Prior Publication Data

US 2005/0255854 A1 Nov. 17, 2005

(30) Foreign Application Priority Data

May 12, 2004 (GB) .................... 0410609.2

(51) Int. Cl.
*H04W 24/00* (2009.01)
(52) U.S. Cl. .............. 455/456.1; 455/456.2; 455/456.3; 455/456.4; 455/456.5; 455/456.6; 455/404.2
(58) Field of Classification Search ... 455/456.1–456.6, 455/404.2
See application file for complete search history.

(56) References Cited

U.S. PATENT DOCUMENTS

| 6,249,252 | B1 | 6/2001 | Dupray | |
|---|---|---|---|---|
| 2002/0094820 | A1* | 7/2002 | Keranen et al. | ............. 455/456 |
| 2003/0125045 | A1 | 7/2003 | Riley et al. | |
| 2003/0125046 | A1* | 7/2003 | Riley et al. | .................. 455/456 |
| 2003/0139188 | A1 | 7/2003 | Chen | |
| 2004/0192330 | A1* | 9/2004 | Gaal | ....................... 455/456.1 |
| 2005/0020309 | A1* | 1/2005 | Moeglein et al. | ............ 455/561 |
| 2005/0037786 | A1* | 2/2005 | Edge | ......................... 455/502 |

FOREIGN PATENT DOCUMENTS

| EP | 1 030 531 A1 | 8/2000 |
|---|---|---|
| WO | WO 03/089954 A1 | 10/2003 |
| WO | WO 2004/016032 A1 | 2/2004 |

OTHER PUBLICATIONS

Cedarvall, M. et al., "Mobile Positioning for Third Generation WCDMA Systems", IEEE, Oct. 5-9, 1998, pp. 1373-1377.
"A Research on the Mobile Location and Mobility Path Prediction", National Formosa University, Taiwan, Jul. 31, 1994.

* cited by examiner

*Primary Examiner*—Patrick N Edouard
*Assistant Examiner*—Justin Y Lee
(74) *Attorney, Agent, or Firm*—Squire, Sanders & Dempsey L.L.P.

(57) ABSTRACT

A method of providing a location estimate for a mobile station in a wireless communications network. The method of providing the location estimate includes implementing, in parallel, a plurality of different location estimate generation methods, each location generation method generating a location estimate. The method of providing the location estimate also includes selecting one of the location estimates based on predetermined criteria.

17 Claims, 8 Drawing Sheets

LOCATING MOBILE TERMINALS

FIELD OF THE INVENTION

The present invention relates to a method and an apparatus for locating a mobile terminal in a communications network, particularly but not exclusively using multiple sources of information.

BACKGROUND TO THE INVENTION

The ability to pinpoint the location of mobile terminals is a desirable feature of a mobile telephone network. This is because of the need to provide customer services which rely on knowing the whereabouts of users of these services. For example, up-to-date local traffic information can be provided to enable a user to avoid nearby traffic jams. A user may also wish to know, for example, how to get to the nearest pub or restaurant from their present location. Clearly the location of the user must be ascertained to within even a few metres for this type of service to work.

Another reason for wishing to know the location of a mobile terminal is so that emergency services can locate a caller who is unable to provide an accurate personal location themselves.

It is known in a GSM mobile network to provide the location of a mobile telephone in terms of the cell of the network in which the telephone is located. Each cell contains one base station and a telephone is only ever in traffic communication with one base station at a given time. Hence the location of the telephone to an accuracy of the cell area can be determined simply by ascertaining with which base station the telephone is communicating. Such methods are known as cell-based location methods. Other methods can be combined with the cell identity (CI), such as a triangulation system, in which the location of a particular mobile phone is calculated using control signals from at least the three base stations closest to it (two of which are located in adjacent cells to the cell in which the mobile telephone is located). This system uses the assumption that the distance of the phone from a base station is proportional to the strength of the signal which the base station receives from it, or the time taken for the signal to travel between the phone and the respective base station. Thus the position of the phone can be determined by comparing the relative strengths or travel times of received signals between the three base stations and thus assessing the distance of the user from each base station. The actual location of the user is then obtainable geometrically since the location of the base stations is known and fixed.

In a 3GPP ($3^{rd}$ Generation Partnership Project) network using a Wideband Code Division Multiple Access (W-CDMA) signalling system, it is possible for a mobile terminal to be in active communication with more than one base station at any one time. This situation is known as "soft handover" and differs from (hard) handover in a GSM system, in which a mobile terminal is "handed over" from one base station to another as it moves between cells of the network. Because of the nature of the soft handover, the above-described cell-based mobile location procedures suitable for GSM can not always be used in a W-CDMA type signalling system. It has therefore been necessary to develop more reliable ways of locating a mobile terminal in this type of signalling system.

In W-CDMA a "softer handover" is defined as well. In the case of "softer handover" the antennas of the base stations with which the mobile station is communicating are co-located (e.g. they are installed at the same physical location or site). In the remainder of this document, the term "soft handover" will be used also to cover the case of "softer handover", and it will be understood by those skilled in the art that the invention and the described embodiments thereof are applicable to a softer handover situation as well as a soft handover situation.

Location techniques are known which are directed towards calculation of a location estimate and a "confidence region" associated with the location estimate of a User Equipment (UE).

One such technique is a Cell Identity and Round Trip Time (CI+RTT) location method.

The CI+RTT location method in UMTS relies on the availability of Round Trip Time (RTT) and Rx-Tx Time Difference (RxTxTD) measurements. RTT and RxTxTD measurements are introduced in UMTS FDD (Frequency Division Duplex) to allow the implementation of the CI+RTT location method.

The RTT is defined as $RTT = T_{Rx}^{UL} - T_{TX}^{DL}$, where $TD_{TX}^{DL}$ is the time of transmission of the beginning of a downlink dedicated physical channel (DPCH) frame to a User Equipment (UE) and $T_{RX}^{UL}$ is the time of reception of the beginning (the first detected path, in time) of the corresponding uplink DPCCH (Dedicated Physical Control Channel)/DPDCH (Dedicated Physical Data Channel) frame from the UE.

The $RTxTxTD = T_{Tx}^{UL} - T_{Rx}^{DL}$ is the difference in time between the UE uplink DPCCH/DPDCH frame transmission ($T_{Tx}^{UL}$) and the first detected path (in time) of the downlink DPCH frame from the measured radio link ($T_{Rx}^{DL}$).

RTTs are measured by the base stations, RxTxTDs are measured by the UE.

By combining a pair of RTT and RxTxTD measurements referred to the same base station the distance between the UE and that base station can be estimated. Such distance estimate is analogous to the distance estimate that can be obtained from one Timing-Advance (TA) in GSM. In this sense, the CI+RTT location method corresponds to the Cell Identity+Timing Advance (CI+TA) location method in GSM. However, two particular features of UMTS FDD make the CI+RTT method potentially more accurate than the CI+TA method in GSM:

1. The much shorter UMTS chip period as compared to the GSM bit period affects the resolution with which a distance estimate can be determined from a TA in GSM or from an (RTT, RxTxTD) pair in UMTS. One GSM bit period is equivalent to approximately 1100 meters while one UMTS chip period is equivalent to approximately 80 meters, thus the distance measurements resolution in UMTS is better than in GSM.
2. In UMTS a UE can be in soft handover. UMTS standards require that RTTs and RxTxTDs are measured for each active radio link, thus multiple distance estimates can be potentially available for locating one UE in UMTS. In GSM this is not possible since the TA is available only for the unique serving cell.

In the CI+RTT location method the unknown geographical coordinates of the UE whose position it is desired to determine are estimated by combining absolute distance measurements between the UE and the base stations in the active set. Each absolute distance measurement is calculated from each (RTT, RxTxTD) pair.

Existing CI+RTT location methods can be considered to fall broadly into two general categories, single-site location methods and multi-site location methods. There are a number of good, reasonably accurate algorithms for implementing multi-site location methods when the UE have active radio links with cells located at three or more sites. However, such methods often fail when two or less sites are available for location calculation purposes.

One of the difficulties with existing location systems is that a location system method is selected to generate a location estimate which may then fail for one or more reason. It then becomes necessary to try a different method, which may or may not be implementable at the site where the first location method was carried out.

It is an aim of the present invention to obviate or at least mitigate this difficulty.

SUMMARY OF THE INVENTION

One aspect of the invention provides a method of providing a location estimate for a mobile station in a wireless communications network, the method comprising: implementing in parallel a plurality of different location estimate generation methods, each method generating a location estimate; and selecting one of the location estimates based on predetermined criteria.

Another aspect of the invention provides in a cellular communications network, a network entity adapted to provide a location estimate for a mobile station in the network, the network entity comprising: means for implementing in parallel a plurality of different location estimate generation methods, each method generating a location estimate; and means for selecting one of the location estimates based on predetermined criteria.

A first location estimate generation method is a weighted mass centre (WMC) method which uses location data for respective sites in radio communication with the mobile station.

Second and third methods are WSC and WSS methods which involve: using first measurement data relating to at least one radio link between the mobile station and a first site in a location calculation method with radio network data of the first site to provide a first preliminary location estimate; using second measurement data relating to at least one radio link between the mobile station and a second site in the location calculation method with radio network data of the second site to provide a second preliminary location estimate; and generating the location estimate as the weighted mass centre of the first and second preliminary location estimates.

In the preferred embodiment, the steps of providing the first and second preliminary location estimates comprise generating first and second respective distance estimates of the distance between the mobile station from the first and second site respectively.

According to the second method, where the first site supports a plurality of cells, the first measurement data relates to radio links of at least two of said cells and a single first distance estimate is generated using the first measurement data of the two radio links.

In the third method, where the first site supports at least first and second located cells, the first measurement data relates to a first radio link from the first cell, and further measurement data is provided which relates to a second link from the second cell. In that case, a further preliminary location estimate is generated which is used with the first and second preliminary location estimates to generate the weighted mass centre of the location estimate of the mobile station. In this case, respective first, second and further distance estimates are preferably generated in the step of providing the first, second and further preliminary location estimates respectively.

The predetermined criteria can be based on distances which are determined between each site and the location estimates. Where distance estimates are obtained as part of the estimate generation location methods. The distance estimates can be used in combination with these distances to minimise an error function, on the basis of which the location estimate to be used can be selected.

For a better understanding of the present invention and to show how the same may be carried into effect, reference will now be made to the accompanying drawings.

DESCRIPTION OF THE PREFERRED EMBODIMENTS

Before describing methods in accordance with embodiments of the present invention, a detailed description of one possibility for calculating a distance estimate will firstly be described with reference to FIG. 1, because this is an important component of the location methods discussed in the following. It will be appreciated however that other distance estimation techniques could be used.

Figure 1:
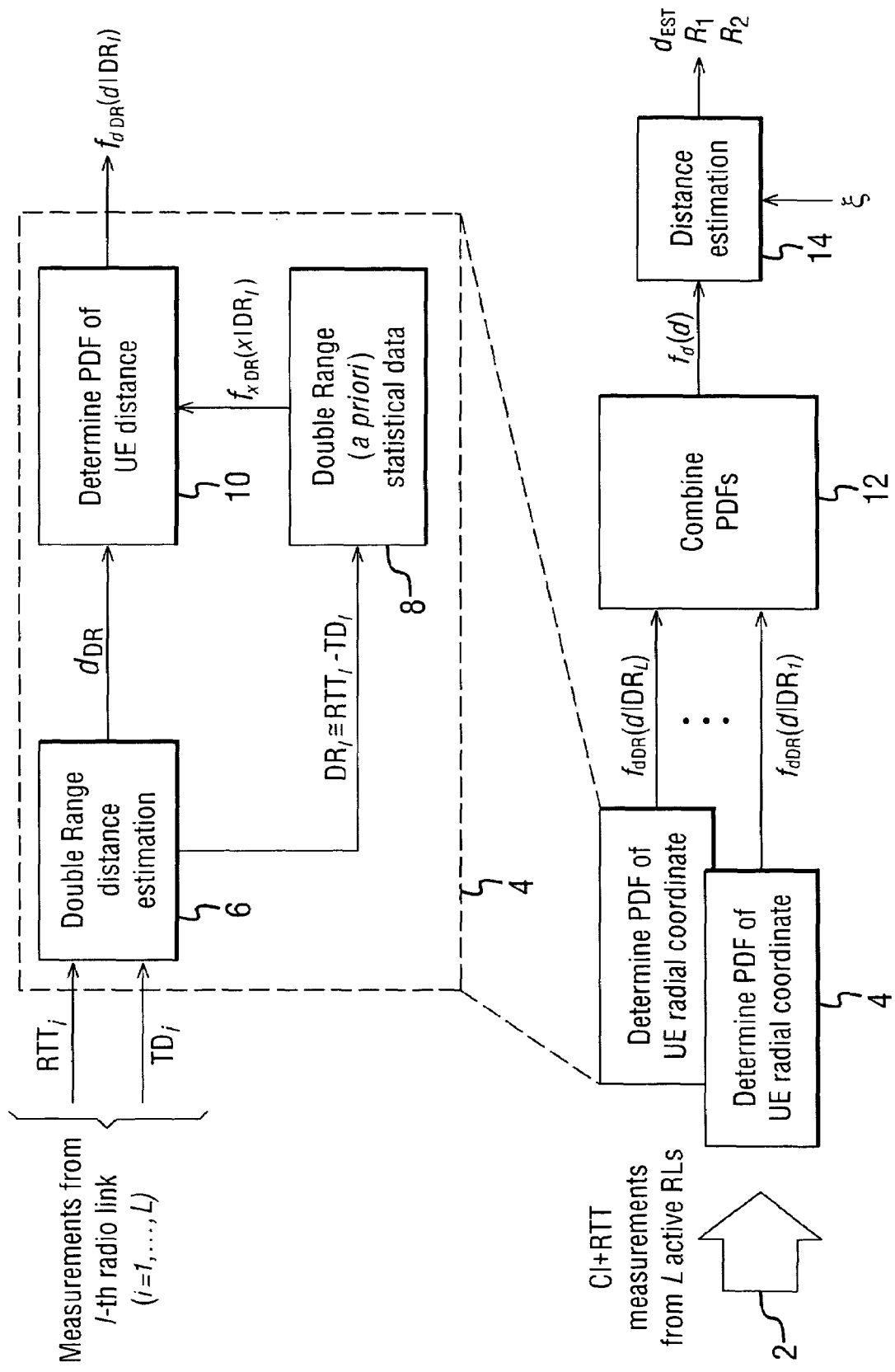
FIG. 1 is a schematic block diagram of distance estimation equipment.
Figure 2:
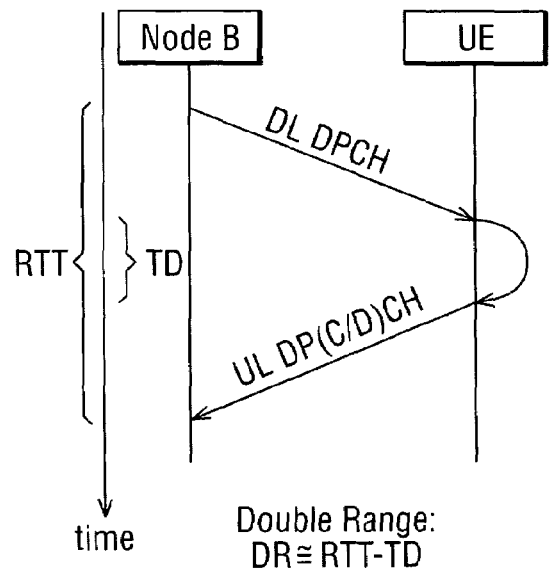
FIG. 2 is a diagram illustrating RTT and TD.

FIG. 1 is a schematic block diagram illustrating the blocks involved in a distance estimate calculation obtained from a set of measurement pairs of the round trip time (RTT) and Rx–Tx time difference (TD). FIG. 2 illustrates what these distances represent in a mobile communications network. FIG. 2 illustrates a user equipment UE which can be in the form of a mobile telephone or other mobile terminal and a Node B, which represents a base station in the universal telecommunications radio access network (UTRAN) system. A downlink dedicated physical channel signal labelled DL DPCH in FIG. 2 dispatched from node B takes a certain amount of time to reach the user equipment UE. There is a time delay TD at the user equipment before an uplink response to the downlink signal is returned from the user equipment to Node B. This response is labelled ULDP(C/D)CH in FIG. 2. The total circuit time measured from dispatch of the downlink signal to receipt of the corresponding uplink signal is the round trip time RTT. That is, it represents the difference between the time of transmission of the beginning of a downlink dedicated physical channel (DPCH) frame to a user equipment UE and the time of reception of the beginning of the corresponding uplink UL dedicated physical control channel (DPCCH)/dedicated physical data channel (DPDCH) frame from the user equipment.

The time difference TD is, as explained, the difference in time between the uplink ULDPCCH/DPDCH frame transmission and the first detected part of the downlink DPCH frame. This delay is in a typical case nominally equal to 1024 chip periods. A measurement pair of $RTT_i$, $TD_i$ values is supplied to the distance estimation equipment from each i-th active radio link in the mobile communications network. The manner in which measurements for co-located cells (that is cells served from the same site) are dealt with differs depending on the location method which is to be implemented, as will become clear in the following. For the purpose of describing FIG. 1, it is assumed that one distance estimate is obtained from a set of RTT, TD measurement pairs measured from active radio links supplied by co-located cells.

The measurement pairs are denoted by arrow 2 in FIG. 1, each pair being supplied to a respective probability function determination block 4. Each probability determination block 4 comprises a double range distance estimation calculator 6 which calculates a double range distance estimate $d_{DR}$ from each RTT and TD measurement pair. $d_{DR}$ is an estimate expressed in metres of the distance between the user equipment and the location of node B at the site of the serving cell. It is calculated by converting into metres an integer number, the so-called double range (DR) which is obtained by removing the TD value contribution from the RTT value. A statistical data block 8 holds a priori statistical data that has been gathered which gives an estimate of the likely measurement error in the double range distance estimate. That is, given the exact distance between the user equipment UE and the serving cell, d, it is possible to calculate the double range measurement error, $x=d-d_{DR}$. Such an error can arise as a result of several factors: multipath and non-line of sight propagation, measurement algorithms inaccuracy, granularity introduced by the measurements' finite resolution, etc. By premeasuring data of this kind, a probability density function of the double range measurement area can be determined and this is supplied to a PDF determination (probability density function determination) block 10 which combines the PDF of DR measurement error $f_{x|DR}(x|DR)$ with the DR distance estimate $d_{DR}$, to obtain the PDF of the UE distance from each co-located serving cell $f_{d|DR}(d|DR)=f_{x|DR}(x=d-d_{DR}|DR)$.

The probability density functions of the distance from all the co-located serving cells is then combined into one probability density function, $f_d(d)$ representing the probability density function of the distance of the user equipment UE from the site where all the serving cells' antennas are installed. This is carried out in the combine PDF block 12. Once the combined PDF is available, the distance estimation is performed in the distance estimation block 14. The result of the distance estimation is represented by three values:

a distance estimate, $d_{EST} \geq 0$
an inner radius, $0 \leq R_1 \leq d_{EST}$
an uncertainty radius, $R_2 \geq 0$ The distance estimate $d_{EST}$ is calculated as the median of the combined distance distribution from the PDFs. The inner and uncertainty radii define a confidence interval $[R_1, R_1+R_2]$ within which the exact distance d of the user equipment UB is estimated to fall with a predefined confidence coefficient, $\xi$. The value of the confidence coefficient depends on the target confidence level requested by the user of the location algorithm, and is input into the distance estimation block 14 as shown in FIG. 1.

Figure 3:
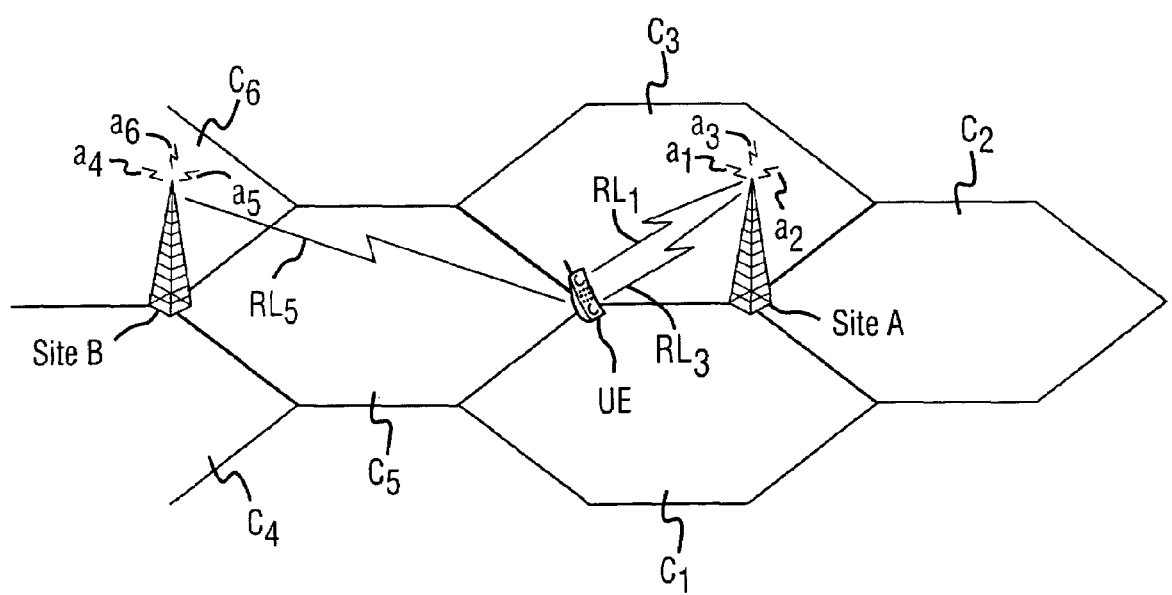
FIG. 3 is a sketch of part of a cellular communications network.

A description of a technique for estimating the location of a user equipment UE in accordance with an embodiment of the invention will now be described. FIG. 3 illustrates the physical situation in which this method may be used.

FIG. 3 represents part of a cellular communications network illustrating a first base station at Site A and a second base station at Site B. Each base station serves three cells with accordingly oriented antennas. The cells are labelled $C_1$, $C_2$ etc and the antennas are labelled $a_1$, $a_2$ etc. The orientation of the antennas at each site is known, and the assumption is made that the cell identity CI provides network data including for example antenna orientation data. A user equipment UE is shown in softer handover at Site A, that is with a first radio link $RL_1$ established with antenna $a_1$, and a second radio link $RL_3$ established with antenna $a_3$. The user equipment UE also has a radio link $RL_5$ established with antenna $a_5$ of the base station at Site B.

Figure 3A:
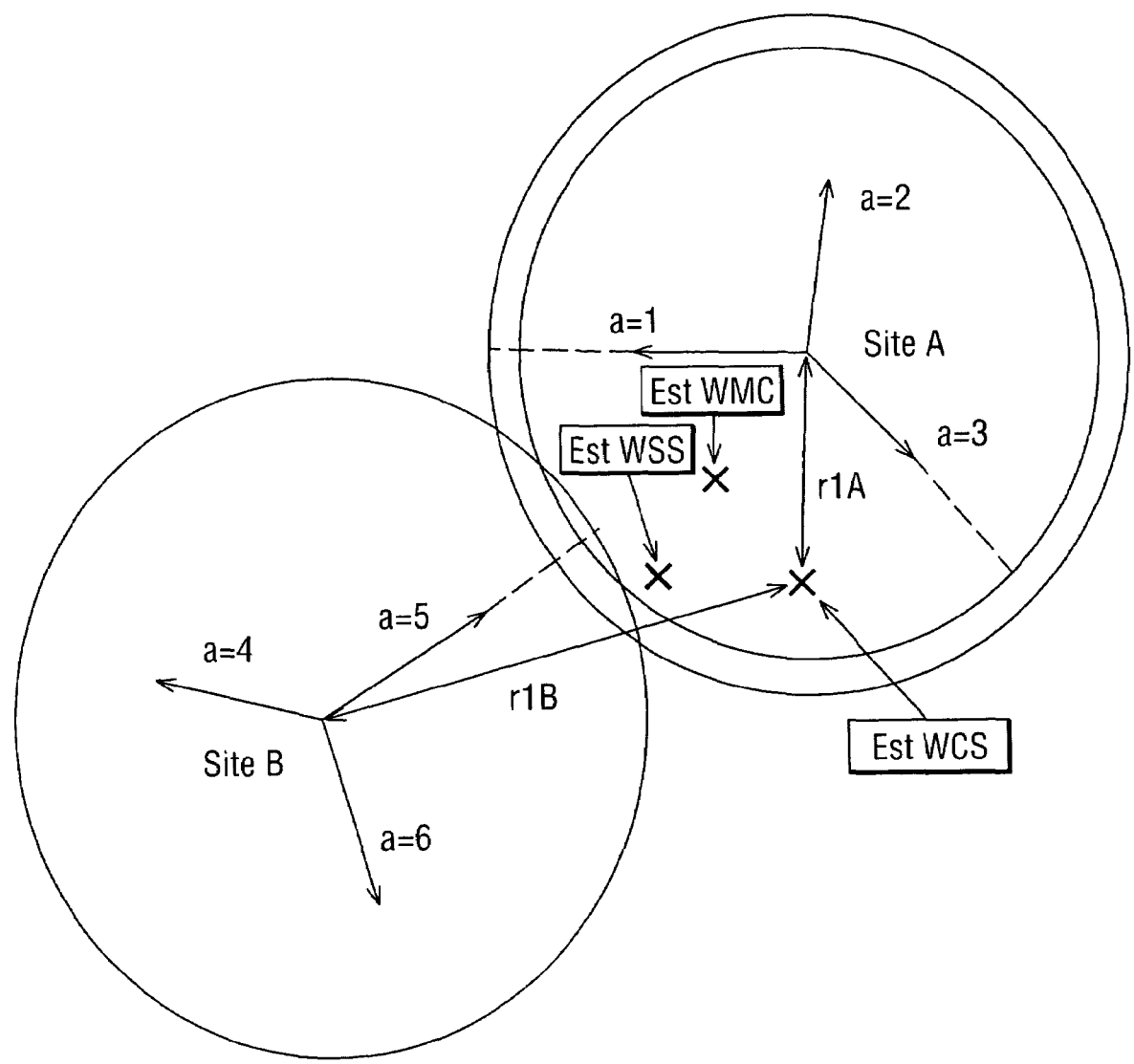
FIG. 3A is a schematic diagram illustrating the principles of an SELM method.

FIG. 3A is a schematic diagram showing how a selecting method for location methods (SELM) can be implemented in the network as illustrated in FIG. 3. FIG. 3A shows the two base stations labelled as Site A and Site B with their respective antennas which are indicated diagrammatically by arrows in approximately the antenna directions. According to the SELM method, a plurality of different location estimates are generated by implementing in parallel a number of different location estimate generation methods. The estimates which have been generated as a result of three such methods are labelled in FIG. 3A Est WMC, Est WSS and Est WCS. Est WSS is a location estimate generated by a weighted single site (WSS) method. Est WCS is a location estimate generated by a weighted single cell (WSC) method. Est WMC is an estimate generated by a weighted mass centre (WMC) method. The WSS and WCS methods will be described in more detail in the following. The WMC method is described in our Patent Application Publication No. (Nokia Ref. NC19511). The weighted mass centre method uses a weighted average of the site's coordinates. The weight applied to each site location is proportional to the reciprocal of the estimated distance between the mobile station and the site. The distance can be estimated using the technique described above with reference to FIG. 1, or in any other way.

The distances from the sites to the generated location estimates is then calculated. These are referred to herein as $r_{mn}$, where m denotes the method which has been used (by an integer 1, 2 ... m ... M) and n denotes the site. As an example, in FIG. 3A r1A and r1B refer to the distances from the WSC estimate to the Sites A and B respectively.

A measure of "goodness" of the estimate can be considered as $e_{mn}=d_{EST,n}-r_{mn}$, where $d_{EST,n}$ is the distance estimate obtained from the location method itself, for example by the technique described above with reference to FIG. 1. In the schematic diagram of FIG. 3A, Site A has two distance estimates associated with it (being the inner and outer radii of the circles centred at Site A), and Site B has a single distance estimate associated with it, being the radius of the circle centred at Site B.

The estimate which is finally selected is based on the estimate which minimises the cost function $f_m=\text{sum}_n\{e_{mn}^2\}$, or $f_m=\text{sum}_n\{|e_{mn}|\}$.

Figure 3B:
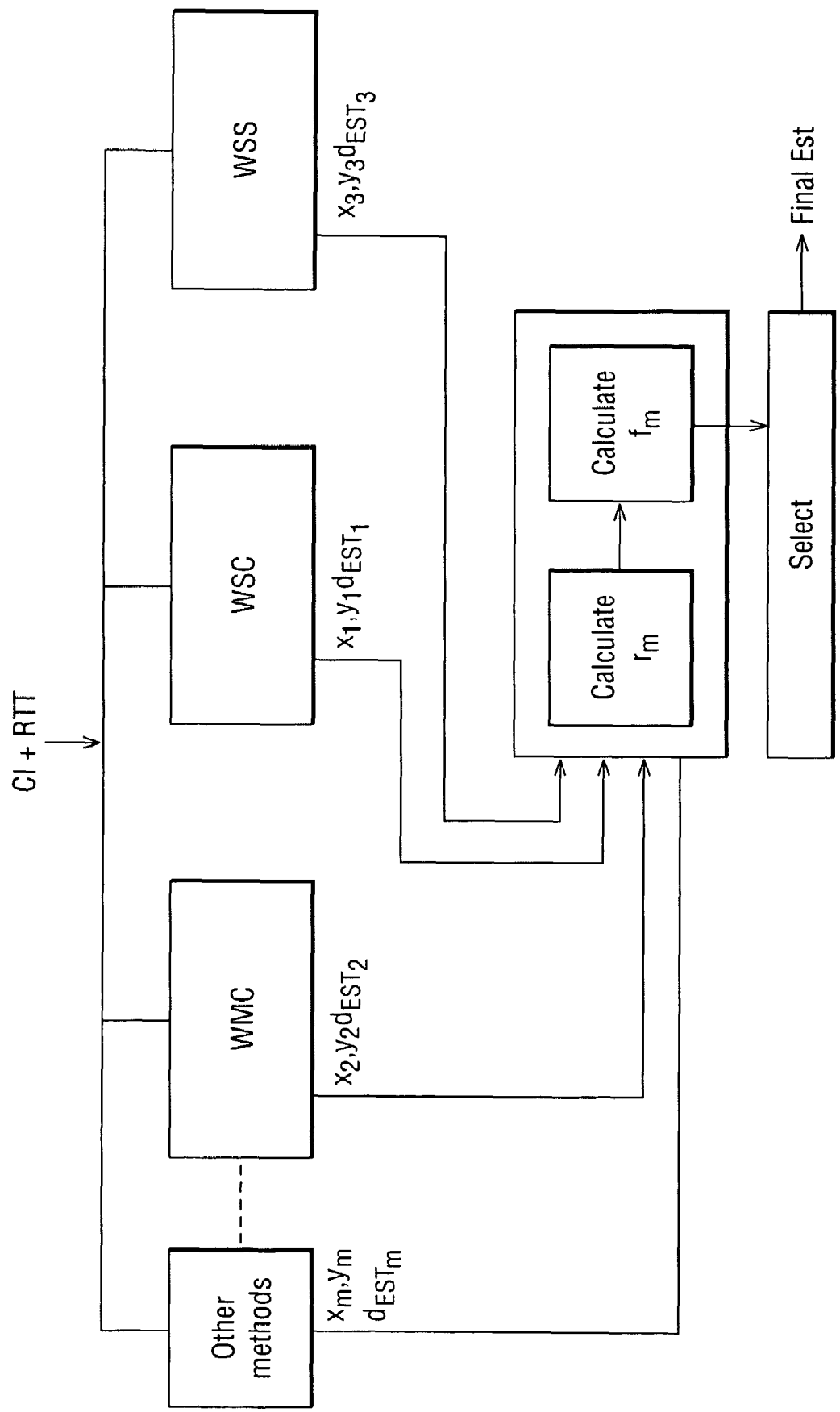
FIG. 3B is a functional block diagram of circuitry implementing the SELM method.

FIG. 3B is a schematic block diagram of the circuitry in terms of functional blocks for implementing the SELM method described above.

The WSS and WSC methods will now be described in more detail with reference to FIGS. 4 and 5.

Figure 4:
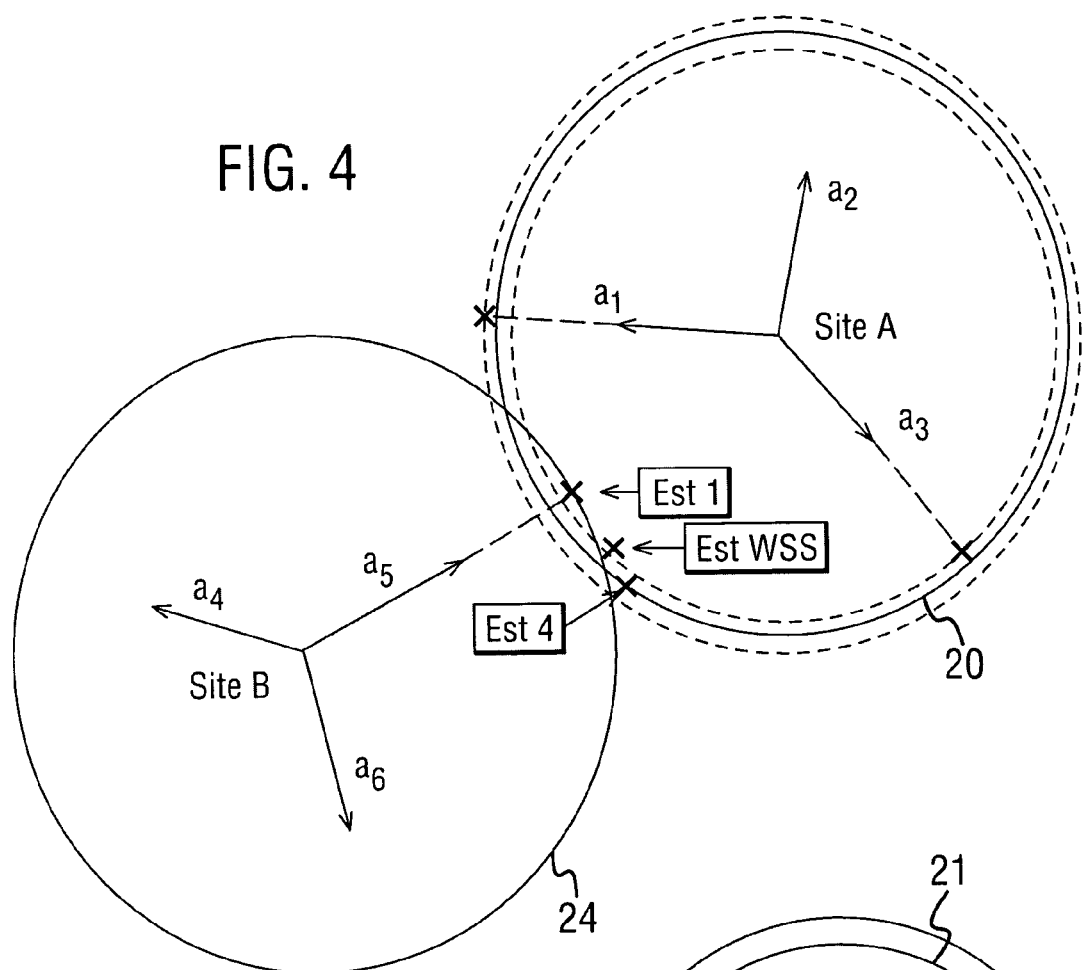
FIG. 4 is a schematic diagram of a WSS location method.
Figure 5:
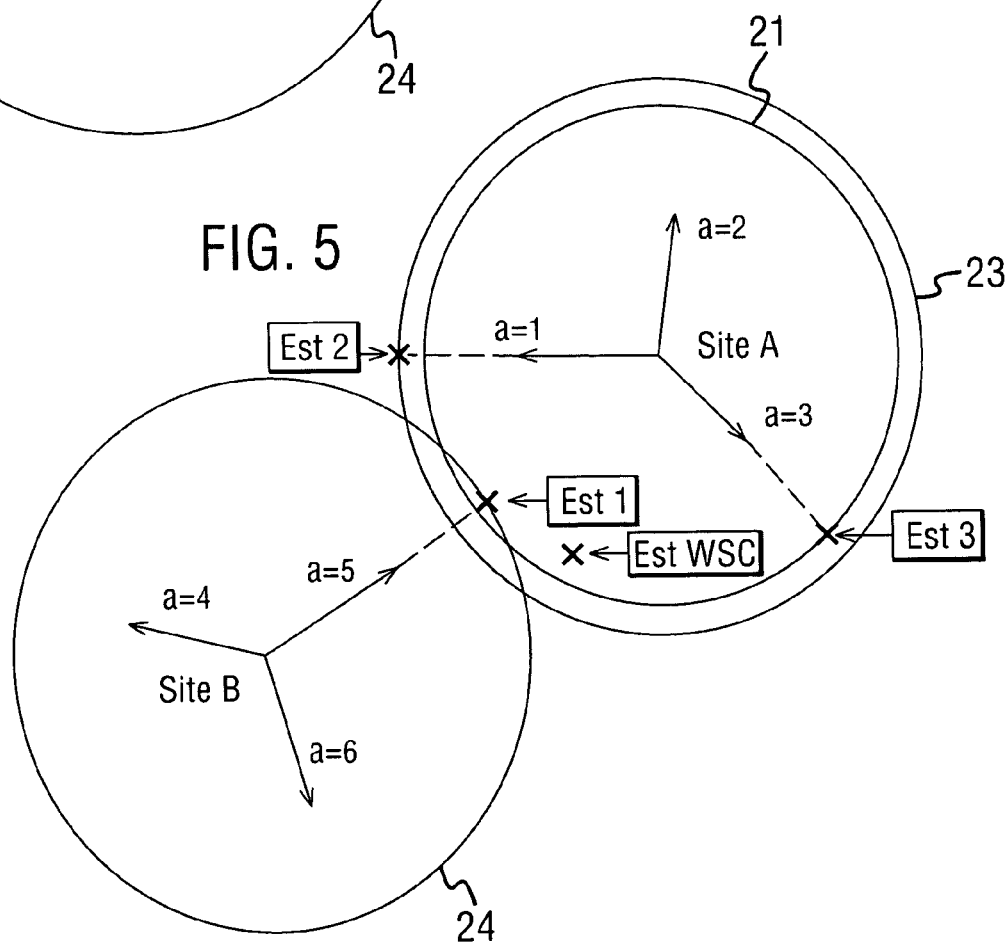
FIG. 5 is a schematic diagram of a WSC location method.

FIG. 4 is a schematic diagram illustrating how a location estimate can be obtained using the WSS method in this situation. A first estimated location which is labelled Est 4 in FIG. 4 is obtained in the following way. RTT, TD pairs from each of the radio links $RL_1$ and $RL_3$ are combined in the distance estimation equipment illustrated in FIG. 1 and an estimated distance $d_{EST}$ is produced, which represents the radius of the circle which is shown in full and labelled 20 in FIG. 4. Note that the dotted circles just inside and outside circle 20 represents different measurements for the estimated distance, which will be discussed more fully in relation to the WSS method discussed below.

A preliminary single site CI+RTT location estimate is obtained using the distance estimate obtained using the technique described above with reference to FIG. 1 and an angular estimation arrived at using a single site CI+RTT location based on the network data from the CI. An "averaged" orientation of the two antennas generating the radio links, in this case $a_1$ and $a_3$ is produced. Each preliminary location estimate is calculated in a polar reference system centred at each cell's site, using the single site CI+RTT method discussed later. The first location estimate Est 4 can thus be seen to lie at a distance $d_{EST4}$ along an averaged orientation of the antennas $a_1$, $a_3$. It will readily be appreciated that the orientation value which is used, being based on an average of the two antennas' orientation is a simple but primitive measurement. If more accurate orientation information relating to the user equipment UE is available, that could also be used to determine the first location estimate Est 4.

A second location estimate is obtained for Site B, in this case applying a single RTT, TD measurement pair to the distance estimation equipment of FIG. 1 and generating an estimated distance $d_{EST1}$ which in this case represents the radius of the circle denoted 24 in FIG. 4. Note that when a single RTT, TD pair is input into the distance estimation equipment of FIG. 1, there is no need to perform the combined PDF step of block 12, because only a single PDF is determined which is supplied directly to the distance estimation block 14. In this case, there is a single radio link RL5 and so the location estimate which is labelled Est 1 in FIG. 4 is generated by taking the estimated distance $d_{EST1}$ with the orientation of that antenna $a_5$, is the simplest case. Again, the angular estimation for the antenna orientation can be generated using the single site CI+RTT location method.

The final location estimate which is labelled Est WSS is obtained as the weighted mass centre of the preliminary location estimates, Est 1, Est 4. That is, the coordinates of the preliminary location estimate are taken (on a polar or Cartesian reference frame), weighted and then averaged.

In a Cartesian reference system, an algorithm which can be used in embodiments of the present invention to obtain the estimated x (and respectively, y) UE coordinates as a weighted average of the x (and respectively, y) site coordinates, the signal of which is received by the MS is given below:

$$\hat{x} = \frac{\sum_{i=1}^{N} w^i x^i}{\sum_{i=1}^{N} w^i}; \quad \hat{y} = \frac{\sum_{i=1}^{N} w^i y^i}{\sum_{i=1}^{N} w^i}; \quad (\hat{x}, \hat{y}) \in \mathcal{D}$$

where $w^1, \ldots, w^N$ are suitable weights assigned to each one of the N estimates involved, $\hat{x}, \hat{y}$ are the coordinates of the final estimate and $x^i$, $y^i$ are the coordinates of each preliminary location estimate.

One suitable definition for the i-th weight used in embodiments of the present invention is to use the inverse of the estimated distance, $d_{ESTi}$ associated with each preliminary location estimate:

$$w^i = \frac{1}{d_{ESTi}}$$

An alternative is to apply constant weights for all cells. A further alternative is to use weights equal to the inverse of the area of an arc-shaped confidence region which is determined as a by-product to the preliminary single site CI+RTT location calculation (discussed later). Another possible criterion for determining the weights is to assign heigher weights to preliminary location estimates which are believed to originate from more accurate distance measurements.

The Weighted Single Cell (WSC) method will now be described with reference to FIG. 5. This method is similar to the method WSS, the main difference between the two consisting in the way that measurements from co-located cells are treated. Note that the physical situation in which this embodiment can be used is the same as that for the WSS method, namely the situation of FIG. 3. In the WSC method each cell is considered separately from other cells. Thus, the number of preliminary location estimates is equal to the number of RTT, TD measurement pairs. The method is implemented as follows.

Firstly, a distance estimate for each of the serving cells is obtained using the distance estimation equipment of FIG. 1 using RTT, TD measurement pairs formed on each of the three active radio links RL1, RL2, RL3. These distance estimates are the respective radii of the circles labelled 21, 23 and 24 (as before). Note that the circles 21 and 23 are those which were illustrated dotted in the embodiment of FIG. 4.

A separate preliminary single site CI+RTT location estimate is then obtained for each distance estimate, calculated in a polar reference system centred at each cell site. Each preliminary location estimate has a distance from the cell site equal to the distance estimate, and an orientation based on the orientation of the particular antenna for that radio link (unless more accurate direction information is available). The preliminary location estimates are labelled Est 1, Est 2 and Est 3 in FIG. 5. The antenna orientations can be established using the single site CI+RTT location method.

The final location estimate which is labelled EST WSC is the weighted mass centre of the preliminary location estimates Est 1, Est 2, Est 3. Obtaining the weighted mass centre, and the weighting values is the same as for the WSS method described above.

In the above methods, reference is made to a CI+RTT location method. One example of such location method will now be described with reference to FIG. 6. The aim of the method is to estimate the UE geographical coordinates and a confidence region where the true UE location is supposedly located with a given degree of confidence $\xi$. The estimated UE coordinates are distance $\rho$ and orientation $\theta$ of the UE from the serving site, represented in the polar reference system. Note that $\rho$—in FIG. 6 corresponds to $d_{EST}$ in FIG. 1. In the following, there is some duplicate description relating to the distance estimation already discussed above, but in this case there is no discussion of how to deal with multiple sites. Note too that like numerals in FIG. 6 denote like parts in FIG. 1.

The estimates are obtained from a probability distribution of the UE geographical location, which is determined by combining observations and a-priori statistical information. A-priori information includes statistical information about the accuracy of DR as a distance measurement and distribution of the UE orientation within cells border.

Figure 6:
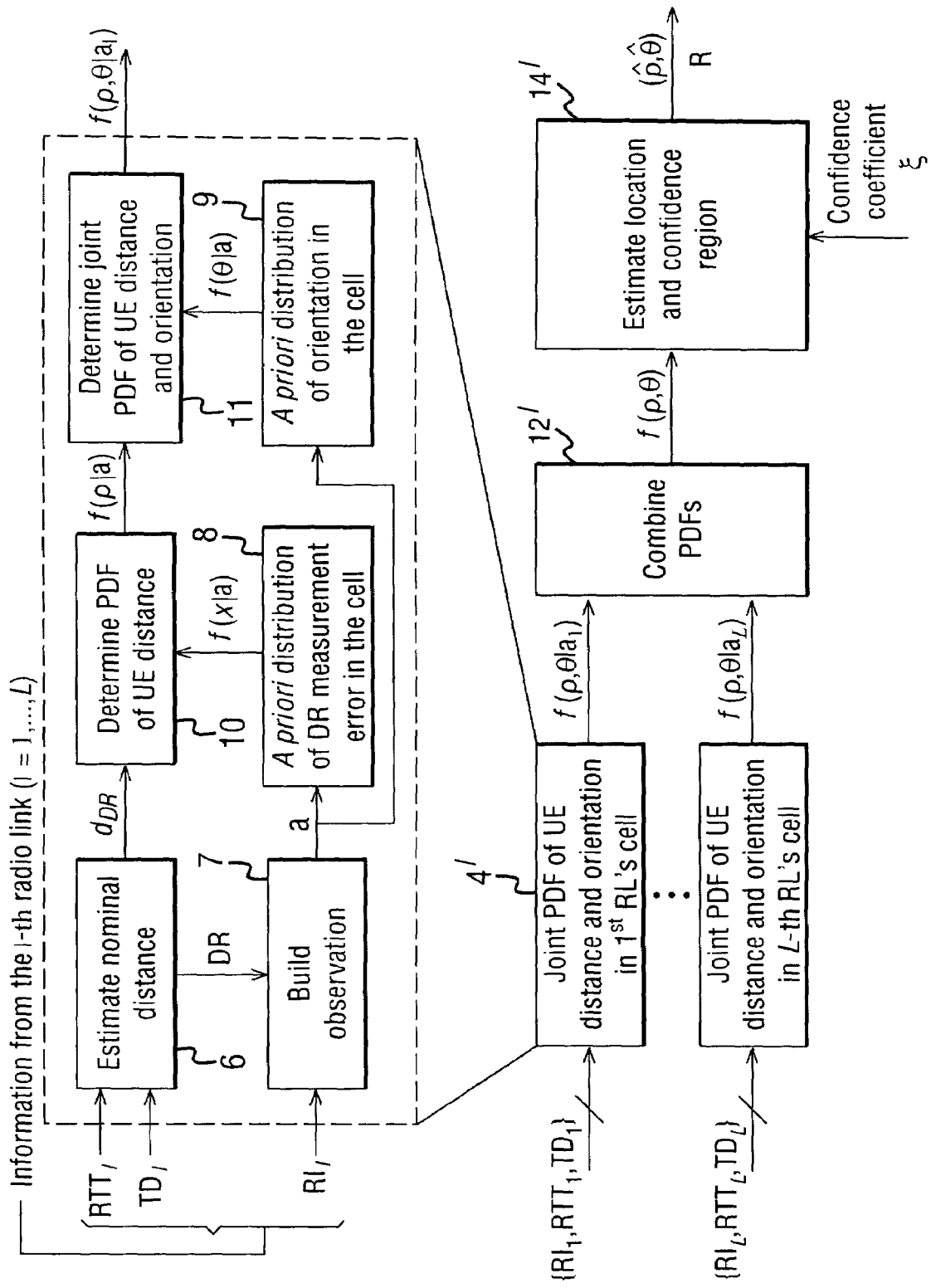
FIG. 6 is a schematic block diagram of equipment for implementing a CI+RTT location method.

Referring to FIG. 6, the location procedure can be seen as a combination of different processing steps, briefly described in the following. The quantization rules at the basis of RTT and Rx–Tx Time Difference definition in UMTS technical specifications, are used to calculate from each {RTT,TD} pair a Double Range Value, DR, and Double Range distance estimate, $d_{DR}$ in block 6. The Double Range is an integer number indicatively equal to the difference RTT−TD; thus it represents an estimate of twice the absolute distance between target UE and (co-located) cells providing the active radio link.

As a result of the nominal distance estimation, the observation a=[RI,DR] (block 7) becomes available. RI is a radio link identifier, for example a cell identifier CI, providing network data.

For example, radio network data for all cells having an active radio link with the user equipment of interest, can include the following:
  antenna coordinates
  bearing of the node B's antenna measured clockwise from x-axis in radian $\phi$
  half power beam width (HPBW) of the node B's antenna, $\Delta\phi$
  $R_F$ the maximum front radius to the service cell
  $R_B$ the maximum back radius to the service cell The Double Range distance estimate is a raw conversion of RTT and TD, reported from UMTS network elements, in a distance estimate. This conversion does not take into account effects of measurement process impairments (multipath and non-line-of-sight propagation over the mobile radio channel, measurement errors, quantization error, etc.) that contribute to determining the so-called Double range measurement error, $\chi=\rho-d_{DR}$, as defined as the difference between the exact distance between UE and node B, $\rho$, and Double Range distance estimate, $d_{DR}$. One way to take into account the DR measurement error, that has proved to be very successful in GSM applications, is to supply the location algorithms with a-priori information describing the statistical behaviour of Double Range measurement error, $\chi$ as in block 8.

The behaviour of $-\chi$ depends on many factors, among them environment and distance between UE and node B. For this reason, the PDF of $-\chi$ conditioned by the observation, $f(\chi|a)$, is used as a-priori PDF from which the statistical behaviour of the UE distance from the serving site is derived. Once the PDF $f(\chi|a)$ is available, the DR distance estimate, $d_{DR}$, is used to obtain the probability density function (PDF) (block 10) of the UE distance in the cell providing the active radio link, $f(\rho|a)$.

An analogous but simpler procedure is used to determine the PDF of the UE orientation in the cell providing the active radio link, $f(\theta|a)$. The additional simplicity is due to the fact that an orientation measurement is not available, thus statistical distribution of the UE angular distribution can be defined only by using a-priori cell-based orientation information (block 9) such as cell orientation, width, etc.

The PDFs of distance conditioned by the observation and of orientation conditioned by the observations are then combined with each other (block 11) to determine the joint PDF of UE distance and orientation within the cell providing each active radio link $f(\rho,\theta a)$. The PDFs available at this stage describe the geographical distribution of users within the borders of each single cell served by node B providing each active radio link.

Once the joint PDFs of distance and orientation within all cells providing active radio links are available (blocks 4') they are combined (block 12') to determine the final joint PDF of distance and orientation, $f(\rho\theta a)$. Such distribution includes all information gathered from observations (radio link identifiers and measurements) and a-priori statistics; thus it can be finally used to estimate UE coordinates $(\hat{\rho},\hat{\theta})$ and confidence region R (block 14'). The priming of blocks 4', 12', 14' denotes that they are equivalent to blocks 4, 12 and 14 of FIG. 1, but providing a more complex function.

Thus, the CI+RTT location algorithm provides as outputs:
  location calculation results being a set of parameters identifying the coordinates of a location estimate and the parameters of a certain confidence region (a geographical region where the exact UE location is estimated to be with a certain probability)
  QoS data which is an indication of whether the location calculation results met the accuracy requirements set in the input quality of service parameters.

The CI+RTT location method involves the two main steps of:
  1. estimating the location of the UE in terms of x-y coordinates and
  2. calculating a confidence region for this location estimate.

A confidence region is a geographical region where the exact UE location is estimated to be with a given probability, referred to as the confidence coefficient $0<\xi\leq1$.

The location calculation method is implemented by location calculation algorithms. Two classes of location calculation algorithms are used:
  Location Estimate Calculation Algorithms to implement step 1
  Confidence Region Calculation Algorithms to implement step 2

The combination of location estimate and confidence region parameters is referred to as "shape". The shape definitions supported by the location calculation algorithms described above are:
  (i) Point Shape (i.e. including only the location estimate)
  (ii) Point with Uncertainty Ellipse Shape (where the confidence region is an ellipse)
  (iii) Point with Uncertainty Polygon Shape (where the confidence region is a polygon)
  (iv) Point with Uncertainty Arc Shape (where the confidence region is a circular arc)

Figure 7:
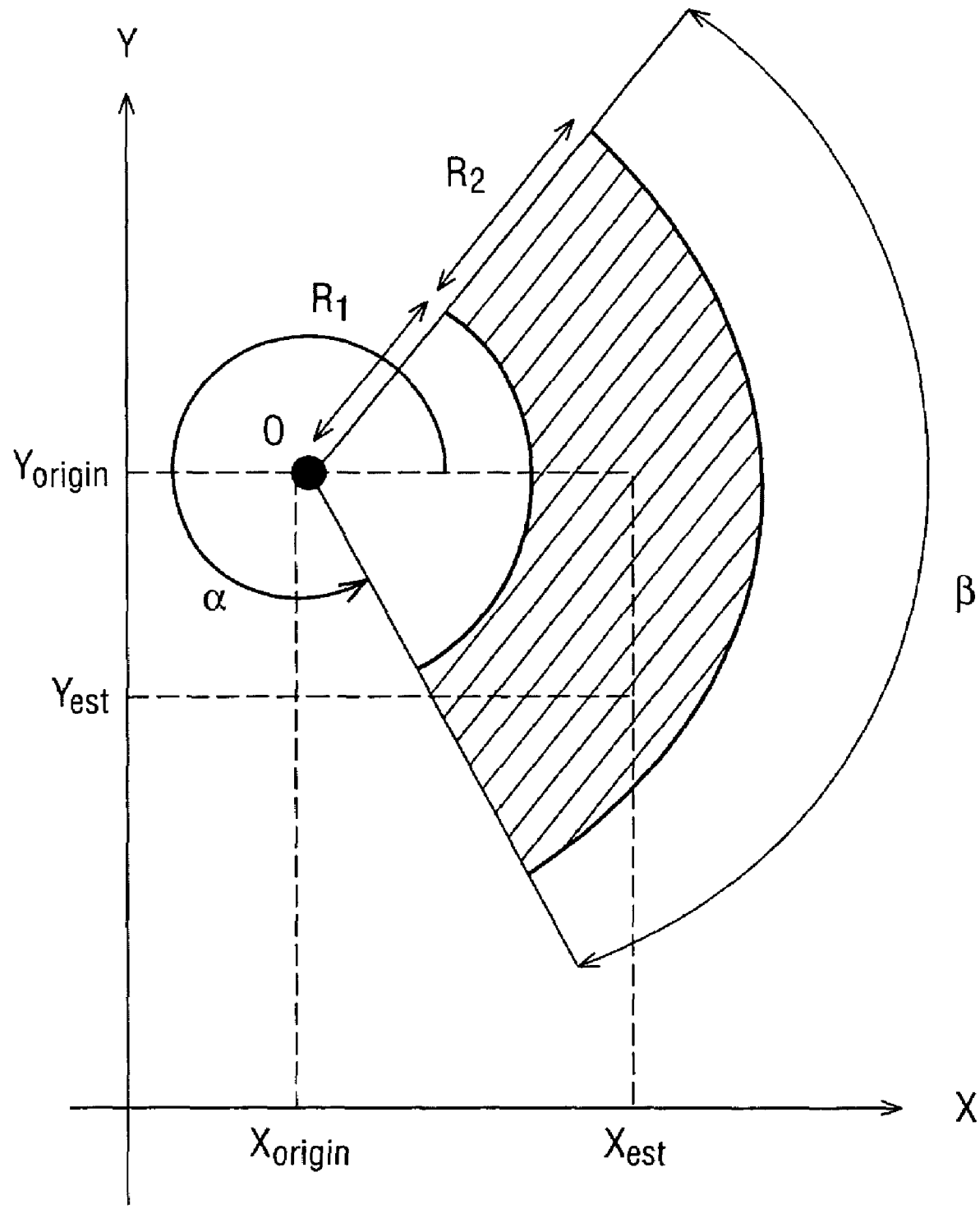
FIG. 7 shows an arc-shaped confidence region.

The only confidence region which will be described herein is the Arc-Shape shown in FIG. 7.

This has the following features:
  Coordinates of a location estimate $(\hat{x},\hat{y})$
  Coordinates of an origin $x_o$ and $y_o$
  Inner radius R1 and uncertainty radius R2
  Offset (orientation) angle $\alpha$ and included angle $\beta$
  Confidence coefficient value $\xi$ In the context of the Single-Site CI+RTT method, the polar coordinates can be used to introduce the following formal definition of R:

$$PR((\rho,\theta)\in R|a_1,\ldots,a_L)=\xi$$

The Arc is the "natural" shape for the Single-Site CI+RTT confidence region. The origin of the arc is at the antenna coordinates, common to all cells providing an active radio link to the UE being located:

$$\begin{cases} x_0 = x_S \\ y_0 = y_S \end{cases}$$

Inner radius $R_1$, uncertainty radius $R_2$, offset angle $\alpha$ and included angle $\beta$ (see FIG. 7) are calculated by means of the above that, when the confidence region is arc shaped and the PDFs of interest are not conditioned by the observations, can be rewritten as:

$$Pr((\rho,\theta)\varepsilon R) = \int\int_R f(\rho,\theta)d\rho d\theta$$
$$= \int_\alpha^{\alpha=\beta} d\theta \int_{R_1}^{R_1+R} f(\rho,\theta)d\rho$$
$$= \xi$$

The total probability theorem can be invoked to write $f(\rho,\theta)$ as:

$$f(\rho,\theta) = \sum_{m=1}^M p_m f(\rho,\theta|a_m) \text{ hence}$$

$$Pr((\rho,\theta)\varepsilon R) = \int_\alpha^{\alpha+\beta} d\theta \int_{R_1}^{R_1+R_2} \left[\sum_{m+1}^M p_m f(\rho,\theta|a_m)\right] d\rho$$

The confidence region parameters $R_1, R_2, \alpha$ and $\beta$ can be uniquely determined if appropriate additional constraints are introduced, according to requirements of a particular implementation.

Figure 8:
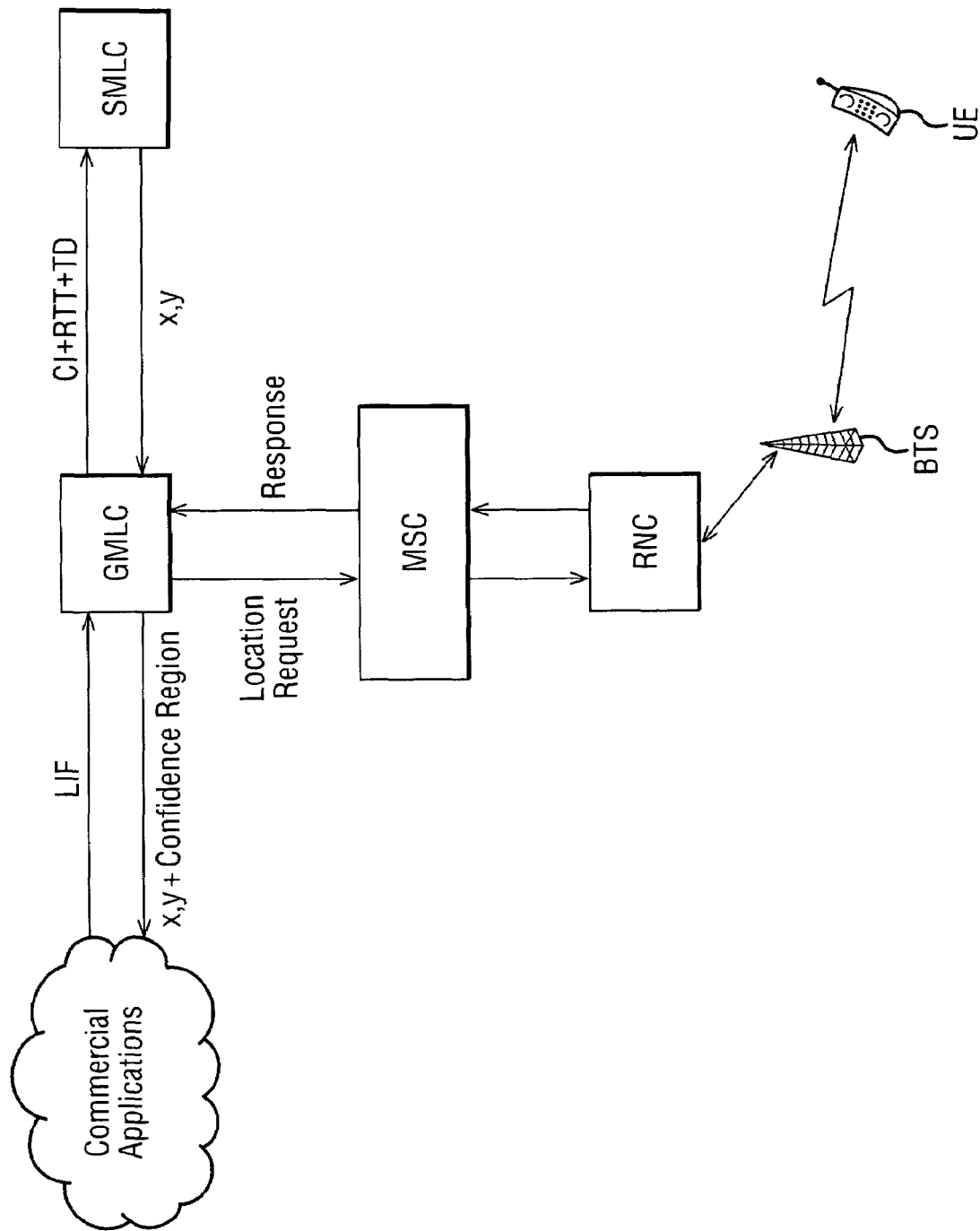
FIG. 8 is a schematic diagram of the architecture of a network.

FIG. 8 is a schematic diagram of the architecture of a network to illustrate where the location methods described above are implemented. A single base station BTS is shown, which can for example be the base station at site A or site B. In fact, base stations at both site A and site B will be in communication with a radio network controller RNC as illustrated for the single base station in FIG. 8. The radio network controller is in communication with a mobile switching MSC which is in turn in communication with a gateway mobile location center GMLC. The gateway mobile location center can receive an LIF request from commercial applications being implemented in the network. The gateway mobile location center dispatches a location request to the mobile switching center which in turn contacts the radio network controller to obtain the necessary network data and return it to the mobile switching center. A response is thus returned to the gateway mobile location center which supplies CI+RTT, TD pairs to a serving mobile location center SMLC. The location methods described hereinabove are implemented at the serving mobile location center and the x, y data of the selected estimate is returned to the gateway mobile location center. The gateway mobile location center returns this x, y data together with the confidence region to the commercial application which requested the location data.

Alternatively, the location methods can be implemented at the RNC or in a stand-alone module elsewhere in the network.

The invention claimed is:

1. A method comprising:
    implementing in parallel a plurality of different location estimate generation methods, each different method generating a location estimate, each of said plurality of different location estimate generation methods using at least one estimate of distance between a mobile station and at least one of a set of sites;
    selecting one of the location estimates based on predetermined criteria to provide a particular location estimate for the mobile station in a wireless communications network, wherein the mobile station has a radio link with the set of sites; and
    determining respective distances between each site in the set of sites and the location estimates, wherein the predetermined criteria use said respective distances to determine which single one of said location estimates is selected.

2. The method according to claim 1, wherein each location estimate generation method comprises:
    generating a distance estimate, the distance estimate comprising an estimate of a distance of a mobile station from each site, wherein the predetermined criteria use these distance estimates in combination with said distances to minimize an error function.

3. The method according to claim 1, further comprising:
    using location data of said sites in a first one of said plurality of different location estimate generation methods.

4. The method according to claim 3, further comprising:
    generating by said first location estimate generation method generates its location estimate as a weighted mass centre of said sites.

5. The method according to claim 1, wherein a second one of said plurality of different location calculation methods comprises:
    using first measurement data relating to at least one radio link between a mobile station and a first site in a location calculation method with radio network data of the first site to provide a first preliminary location estimate;
    using second measurement data relating to at least one radio link between the mobile station and a second site in the location calculation method with radio network data of the second site to provide a second preliminary location estimate; and
    generating the particular location estimate as a weighted mass center of the first and second preliminary location estimates.

6. The method according to claim 5, further comprising:
    supporting a plurality of cells with the first site; and
    relating the first measurement data to radio links of at least two of said plurality of cells,
    wherein providing the first preliminary location estimate comprises generating a single first distance estimate using the first measurement data of the at least two radio links, and wherein providing the second preliminary location estimate comprises generating a second distance estimate using the second measurement data.

7. The method according to claim 5, further comprising:
    supporting at least first and second located cells with the first site, wherein the first measurement data relates to a first radio link from the first located cell;
    receiving further measurement data which relates to a second radio link from the second located cell; and
    using the further measurement data in the location calculation method with the radio network data to provide a further preliminary location estimate which is used with the first and second preliminary location estimates to generate the weighted mass center of the particular location estimate of the mobile station.

8. A method as claimed in claim 1, wherein said plurality of different location estimate generation methods comprises a cell identifying and round trip time method.

9. A method as claimed in claim 1, wherein said plurality of different location estimate generation techniques comprises one or more of the following methods:
    weighted single site method; and a weighted single cell method and a weighted mass centre method.

10. An apparatus comprising:

first implementing means for implementing in parallel a plurality of different location estimate generation methods, each different method generating a location estimate, each of said plurality of different location estimate generation methods using at least one estimate of distance between a mobile station and at least one of a set of sites;

selecting means for selecting a single one of the location estimates based on predetermined criteria for providing a particular location estimate for the mobile station in a cellular communications network; and first determining means for determining respective distances between each of said sites with which the mobile station has a radio link and the location estimates, wherein the predetermined criteria use said respective distances to determine which single one of said location estimates is selected.

11. The apparatus according to claim 10, further comprising:

second implementing means for implementing a location calculation method using measurement data relating to radio links between the mobile station and respective first and second sites and radio network data to provide respective first and second preliminary location estimates; and second determining means for determining the particular location estimate as a weighted mass center of the first and second preliminary location estimates.

12. The apparatus according to claim 11, further comprising:

a radio network controller operably connected to at least one of the first implementing means, the selecting means, the second implementing means, and the first determining means.

13. The apparatus according to claim 11, further comprising:

generating means for generating distance estimates, each distance estimate comprising an estimate of a distance of the mobile station from each site, wherein the predetermined criteria use the distance estimates in combination with said distances to minimize an error function.

14. An apparatus, comprising:

a first processor configured to implement in parallel a plurality of different location estimate generation methods, each different method generating a location estimate, each of said plurality of different location estimate generation methods using at least one estimate of distance between a mobile station and at least one of a set of sites;

a controller configured to select a single one of the location estimates based on predetermined criteria to provide a particular location estimate for the mobile station in a cellular communications network; and a first determining unit configured to determine respective distances between each of said sites and the location estimates, wherein the predetermined criteria use said respective distances to determine which single one of said location estimates is selected.

15. The apparatus according to claim 14, further comprising:

a second processor configured to implement a location calculation method using measurement data relating to radio links between the mobile station and respective first and second sites and radio network data to provide respective first and second preliminary location estimates; and a second determining unit configured to determine the particular location estimate as a weighted mass center of the first and second preliminary location estimates.

16. The apparatus according to claim 15, further comprising:

a radio network controller operably connected to at least one of the first processor, the controller, the second processor, and the second determining unit.

17. The apparatus according to claim 15, further comprising:

a generator configured to generate distance estimates, each distance estimate comprising an estimate of a distance of the mobile station from each site, wherein the predetermined criteria use the distance estimates in combination with said distances to minimize an error function.

* * * * *